United States Patent [19]

Evangelisti

[11] Patent Number: 5,074,579
[45] Date of Patent: Dec. 24, 1991

[54] MCPHERSON-TYPE SUSPENSION UNIT FOR MOTOR VEHICLES

[75] Inventor: Raffaele Evangelisti, Turin, Italy

[73] Assignee: Fiat Auto SpA, Turin, Italy

[21] Appl. No.: 606,969

[22] Filed: Oct. 31, 1990

[51] Int. Cl.⁵ .............................................. B60G 13/00
[52] U.S. Cl. ................................... 280/668; 280/671;
280/673; 280/716; 267/220
[58] Field of Search ............... 280/668, 666, 671, 673,
280/716; 267/220

[56] References Cited

U.S. PATENT DOCUMENTS

| | | | |
|---|---|---|---|
| 3,493,242 | 2/1970 | Nicholls | 280/673 |
| 4,234,172 | 11/1980 | Takahashi | 267/220 |
| 4,249,645 | 2/1981 | Level et al. | 267/200 |
| 4,690,425 | 9/1987 | Kubo | 280/668 |
| 4,721,325 | 1/1988 | Mackovjak et al. | 280/668 |
| 4,747,587 | 5/1988 | Ferrel | 280/668 |

FOREIGN PATENT DOCUMENTS

| | | |
|---|---|---|
| 2626392 | 12/1977 | Fed. Rep. of Germany . |
| 7603430 | 9/1976 | France . |
| 0696276 | 8/1953 | United Kingdom ................ 280/673 |

Primary Examiner—Kenneth R. Rice
Assistant Examiner—M. Shaughnessy
Attorney, Agent, or Firm—Sughrue, Mion, Zinn, Macpeak & Seas

[57] ABSTRACT

A McPherson-type suspension unit for motor vehicles, in which the rod is connected to the motor-vehicle body by means of a resilient connection formed so that the plane in which the rod bears against the body is displaced below the free end of the rod. The connection includes an annular block of elastomeric material whose internal surface is joined to an inverted cup-shaped member fixed to the free end of the rod and whose external surface is joined to a hollow body which surrounds the cup-shaped member and the upper end of which carries a member for fixing the connection to the body at a level substantially corresponding to that of the free end of the rod.

7 Claims, 1 Drawing Sheet

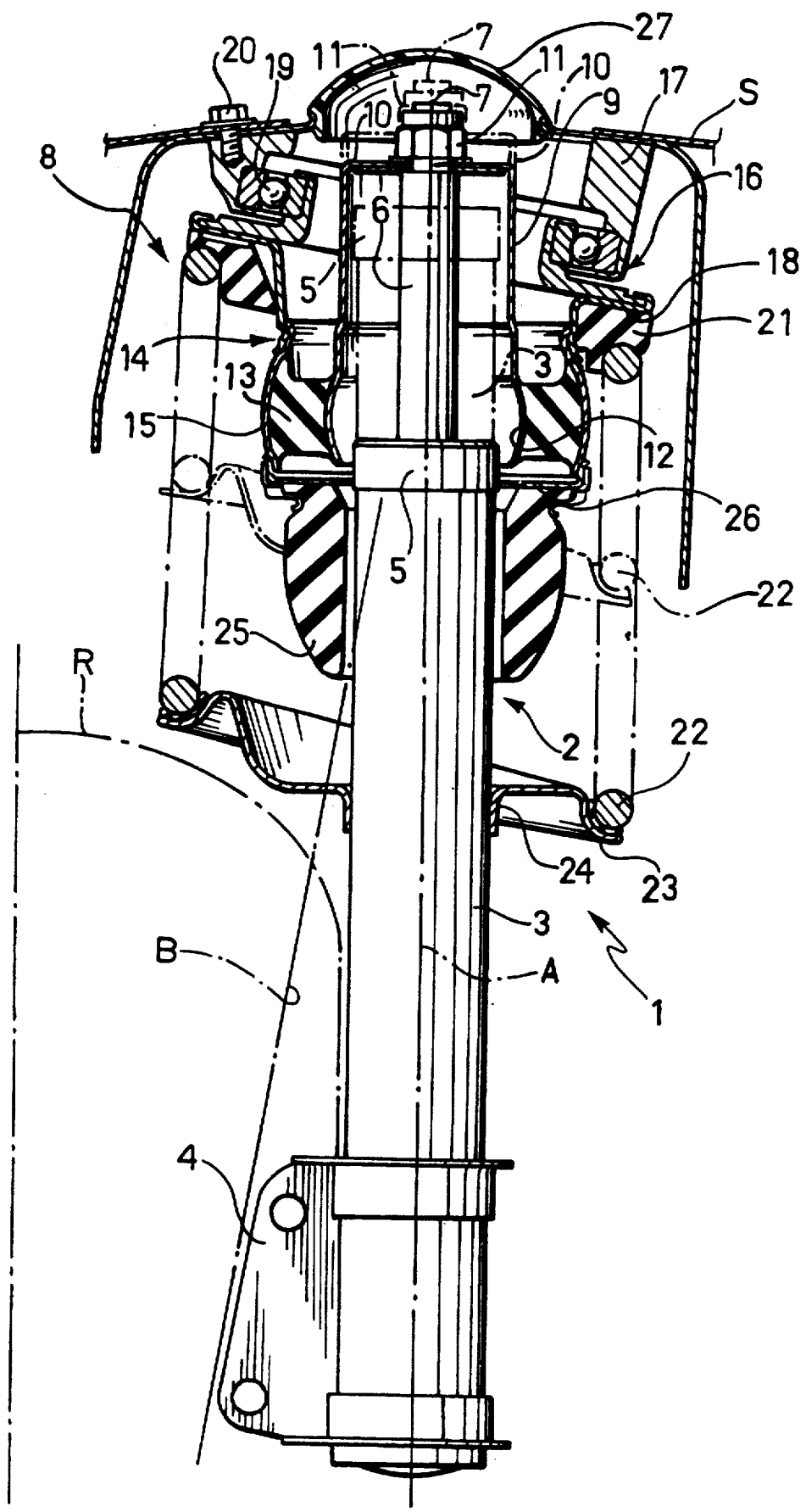

MCPHERSON-TYPE SUSPENSION UNIT FOR MOTOR VEHICLES

BACKGROUND OF THE INVENTION

The present invention relates in general to McPherson-strut suspension units for motor vehicles, of the type comprising a telescopic shock-absorber including a tube carrying a wheel mounting at its lower end, a rod slidable through the upper end of the tube, a helical compression spring surrounding the shock-absorber, and a resilient connection for connecting the free end of the rod to the body.

Suspension units of this type have a problem in that the transverse components of the forces transmitted from the wheel in use tend to cause the shock-absorber, and particularly its rod, to be deformed by bending since its connection to the body is conventionally formed in such a way that the point at which the transverse forces are applied coincides with the region of its free end. The bending of the rod makes it difficult for it to slide and causes it to jam in the tube.

In order to resolve this problem, it has been proposed to connect the rod to the body in an arrangement such that the plane in which the rod bears against the body is displaced below the free end of the rod so as to reduce the lever arm of the transverse loads applied thereto and thus to reduce the bending.

Solutions of this type are described, for example, in FR-A-2301399 and DE-A-2626392. In both cases, the connection for fixing the rod to the body includes a member substantially in the form of an inverted cup fixed at its upper end to the free end of the rod and at its lower end to an annular block of elastomeric material connected to the body. The block is situated at the level of the body and the cup-shaped member, together with the portion of the rod surrounded thereby, therefore extends above the region where the shock-absorber is connected to the body. This projection obviously involves greater transverse bulk of the suspension unit and consequent difficulties in adapting the bodywork of the vehicle to enable its installation.

SUMMARY OF THE INVENTION

The object of the present invention is to avoid the aforesaid disadvantages and to provide a suspension unit of the type defined above which reduces the adverse effect of transverse loads applied to the rod without the need for the shock-absorber to project above the region where the suspension unit is connected to the body of the vehicle.

According to the invention, this object is achieved by virtue of the fact that the resilient connection of the rod to the body also includes a hollow body which surrounds the cup-shaped member and the lower end of which is joined thereto by means of the annular block of elastomeric material, the upper end of the hollow body carrying a member for fixing the connection to the body at a level which corresponds substantially to that of the free end of the shock-absorber rod.

The invention has the advantage that it can be applied to conventional McPherson-type suspension units without the need for structural modifications of the shock-absorber or of the body to which it is fitted.

In the static installed condition of the shock-absorber, the block of elastomeric material is preferably arranged around substantially the upper end of the tube. The "static installed condition" obviously means the axial configuration assumed by the shock-absorber under the load of the suspended mass of the vehicle to which the suspension unit is fitted; since the tube moves up the rod under dynamic conditions, the arrangement according to the invention considerably reduces the length of the rod which is free to bend in operation.

According to a preferred structural embodiment, the fixing member of the connection incorporates an axial rolling bearing and, beneath the latter, also defines an annular bearing plate for the upper end of the helical spring. Moreover, a resilient stroke-limiting buffer which surrounds the tube with clearance is conveniently fixed to the hollow body of the connection beneath the block of elastomeric material and cooperates with an annular plate which is fixed to the tube and against which the lower end of the helical spring bears.

BRIEF DESCRIPTION OF THE DRAWINGS

The invention will now be described in detail with reference to the appended drawing which is provided purely by way of non-limiting example and shows schematically, in partial axial section, a suspension unit according to the invention.

With reference to the drawing, a McPherson-type suspension unit for motor vehicles is generally indicated 1 and supports the structure or body S of the vehicle on a wheel R which, in the example, is a front steering wheel.

DETAILED DESCRIPTION OF THE INVENTION

The suspension unit 1 comprises a conventional shock-absorber 2 with a tube 3 which carries a wheel mounting 4 at its lower end and has a rod 6 projecting from its upper end, indicated 5. The rod 6 is guided for axial sliding by means of a bush, not shown, inserted in the upper end region 5 of the tube 3 in known manner.

The free end of the rod 6, indicated 7, is articulated to the body S of the vehicle by means of a resilient connection, generally indicated 8.

The connection 8 includes an inverted cup-shaped member 9, the free end 7 of the rod 6 passing through the transverse wall 10 thereof and being fixed thereto by means of a nut 11.

The axial dimension of the side wall of the cup-shaped member 10 is such that, when the suspension unit 1 is in the static installed configuration shown in the drawing, its lower end surrounds the upper end 5 of the tube 3. This lower end, indicated 12, is convex and is fixed to the internal surface of an annular block 13 of the elastomeric material whose external surface is fixed in turn to a hollow body, generally indicated 14, which surrounds the cup-shaped element 9.

The hollow body 14 has a lower portion 15 which is convex like the lower end 12 of the cup-shaped element 9 and constitutes the element for joining to the elastomeric block 13, and an upper portion 16 whose axis B is inclined to the axis A of the shock-absorber 2. The upper portion 16 includes a fixing member 17 of varying thickness, an annular bearing plate 18 fixed to the lower portion 15, and an axial rolling bearing 19 whose outer and inner races are carried by the fixing member 17 and the plate 18 respectively.

The fixing member 17 is connected to the body S by means of screws 20: as can clearly be seen in the drawing, it bears against the body S from below and the arrangement is such that the free end 7 of the rod 6 is situated at a level which corresponds substantially to that of the region of the body S in which the screws 20 are fitted. The vertical bulk of the shock-absorber 2 is thus kept within that of the said region of the body S.

An annular element 21 of elastomeric material, against which the upper end of a helical compression spring 22 surrounding the upper region of the shock-absorber 2 bears, is fitted to the lower face of the plate 18. The lower end of the spring 22 reacts against a plate 23 fixed at 24 to the tube 3 and arranged parallel to the plate 18.

The configuration of the suspension unit 1 shown in broken outline in the drawing corresponds to the telescoped condition (that is, the most contracted condition) of the shock-absorber 2 and the spring 22: in this condition, the plate 24 cooperates with a resilient stroke-limiting buffer 25 which surrounds the upper region of the tube 3 with clearance and is fixed at the top to an annular base wall 26 of the hollow body 14.

The maximum dynamic travel of the free end of the rod 6 as a result of the resilient yielding of the block 13 is also shown in broken outline in the drawing: as can clearly be seen, its upward travel from the static condition in which it is level with the body S is small and is contained within a cover 27 fitted to the body S.

What is claimed is:

1. In a McPherson-type suspension unit for a motor vehicle, comprising a telescopic shock-absorber including a tube carrying a wheel mounting at its lower end, a rod having a free end and being slidable through an upper end of the tube, a helical compression spring having an upper end and a lower end and surrounding the shock-absorber and a resilient connection for connecting the free end of the rod to a body of the motor vehicle, the connection being formed in such a way that the plane in which the rod bears against the body of the motor vehicle is displaced below the free end of the rod and includes a member substantially in the form of an inverted cup fixed at its upper end to the free end of the rod and at its lower end to an annular block of elastomeric material connected to the body of the motor vehicle, the improvement wherein the connection also includes a hollow body having an upper end and a lower end and which surrounds the inverted cup member, the lower end of said hollow body being joined to the lower end of the inverted cup member by means of the annular block of elastomeric material, the upper end of the hollow body carrying a member for fixing the connection to the body of the motor vehicle at a level which corresponds substantially to that of the free end of the rod of the shock-absorber, wherein the annular block of elastomeric material is arranged substantially around the upper end of the tube when the shock-absorber is in a static installed condition.

2. A suspension unit according to claim 1, wherein the fixing member incorporates an axial rolling bearing.

3. A suspension unit according to claim 2, wherein beneath the bearing, the fixing member defines an annular bearing plate for the upper end of the helical spring.

4. A suspension unit according to claim 3, wherein the axis of the bearing and the bearing plate are inclined to the axis of the shock-absorber at an angle other than 90°.

5. A suspension unit according to claim 3, wherein an annular element of elastomeric material is interposed between the spring and the bearing plate.

6. A suspension unit according to claim 1, wherein a resilient, annular stroke-limiting buffer which surrounds the tube of the shock-absorber with clearance is fixed to the hollow body of the connection beneath the block of elastomeric material and cooperates with an annular plate which is fixed to the tube and against which the lower end of the helical spring bears.

7. In a McPherson-type suspension unit for a motor vehicle, comprising a telescopic shock-absorber including a tube carrying a wheel mounting at its lower end, a rod having a free end and being slidable through an upper end of the tube, a helical compression spring having an upper end and a lower end and surrounding the shock-absorber and a resilient connection for connecting the free end of the rod to a body of the motor vehicle, the connection being formed in such a way that the plane in which the rod bears against the body of the motor vehicle is displaced below the free end of the rod and includes a member substantially in the form of an inverted cup fixed at its upper end to the free end of the rod and at its lower end to an annular block of elastomeric material connected to the body of the motor vehicle, the improvement wherein the connection also includes a hollow body having an upper end and a lower end and which surrounds the inverted cup member, the lower end of said hollow body being joined to the lower end of the inverted cup member by means of the annular block of elastomeric material, the upper end of the hollow body carrying a member for fixing the connection to the body of the motor vehicle at a level which corresponds substantially to that of the free end of the rod of the shock-absorber, wherein a resilient, annular stroke-limiting buffer which surrounds the tube of the shock-absorber with clearance is fixed to the hollow body of the connection beneath the block of elastomeric material and cooperates with an annular plate which is fixed to the tube and against which the lower end of the helical spring bears.

* * * * *

UNITED STATES PATENT AND TRADEMARK OFFICE
CERTIFICATE OF CORRECTION

PATENT NO. : 5,074,579

DATED : December 24, 1991

INVENTOR(S) : Raffaele EVANGELISTI

It is certified that error appears in the above-identified patent and that said Letters Patent is hereby corrected as shown below: Insert the following information:

[30]  Foreign Application Priority Data
      11/14/89     ITALY      68001-A/89

Signed and Sealed this

Thirty-first Day of August, 1993

Attest:

BRUCE LEHMAN

Attesting Officer

Commissioner of Patents and Trademarks